(12) United States Patent
Nishijima et al.

(10) Patent No.: US 8,968,936 B2
(45) Date of Patent: *Mar. 3, 2015

(54) METHOD FOR PRODUCING LITHIUM-CONTAINING COMPOSITE OXIDE

(75) Inventors: Motoaki Nishijima, Osaka (JP); Koji Ohira, Osaka (JP); Toshitsugu Sueki, Osaka (JP); Shougo Esaki, Osaka (JP); Isao Tanaka, Kyoto (JP); Yukinori Koyama, Kyoto (JP); Katsuhisa Tanaka, Kyoto (JP); Koji Fujita, Kyoto (JP); Shunsuke Murai, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/701,273

(22) PCT Filed: Jun. 1, 2011

(86) PCT No.: PCT/JP2011/062599
§ 371 (c)(1),
(2), (4) Date: Dec. 12, 2012

(87) PCT Pub. No.: WO2011/152455
PCT Pub. Date: Dec. 8, 2011

(65) Prior Publication Data
US 2013/0075673 A1      Mar. 28, 2013

(30) Foreign Application Priority Data

Jun. 2, 2010  (JP) ................ 2010-126499
Jun. 2, 2010  (JP) ................ 2010-126503
Jun. 2, 2010  (JP) ................ 2010-126504

(51) Int. Cl.
*H01M 4/1391*   (2010.01)
*H01M 4/58*     (2010.01)
(Continued)

(52) U.S. Cl.
CPC ............ *H01M 4/5825* (2013.01); *C01B 25/45* (2013.01); *C01B 33/20* (2013.01)
USPC ................. 429/231.95; 429/323; 429/321

(58) Field of Classification Search
USPC .............. 429/300, 322, 323, 231.95
See application file for complete search history.

(56) References Cited

U.S. PATENT DOCUMENTS 6,085,015 A      7/2000  Armand et al.
2002/0045098 A1  4/2002  Tabuchi et al.
(Continued)

FOREIGN PATENT DOCUMENTS

CA    2 358 281 A1    4/2002
CA    2 550 496 A1    7/2005
(Continued)

OTHER PUBLICATIONS

Deng et al. Effect of Mn substitution on the structural, morphological and electrochemical behaviors of Li2Fe1 MnxSiO4 synthesized via citric acid assisted sol-gel (Journal of Alloys and Compounds 487 (2009) L18-L23).*

(Continued)

*Primary Examiner* — Mark F Huff
*Assistant Examiner* — Olatunji Godo
(74) *Attorney, Agent, or Firm* — Nixon & Vanderhye P.C.

(57) ABSTRACT

The present invention provides a method for producing a lithium-containing composite oxide represented by general formula (1) below, the method at least including a step of preparing a solution by dissolving a lithium source, an element M source, a phosphorus source, and an element X source that serve as source materials in a solvent, the phosphorus source being added after at least the element M source is dissolved; a step of gelating the resulting solution; and a step of calcining the resulting gel:

$$Li_xM_yP_{1-z}X_zO_4 \qquad (1)$$

(where M represents at least one element selected from the group consisting of Fe, Ni, Mn, Zr, Sn, Al, and Y; X represents at least one element selected from the group consisting of Si and Al; and $0 < x \le 2$, $0.8 \le y \le 1.2$, $0 \le z \le 1$). According to the present invention, a positive electrode active material for lithium secondary batteries that offers high safety and high cost efficiency and are capable of extending battery life can be provided.

5 Claims, 5 Drawing Sheets

(51) Int. Cl.
*C01B 25/45* (2006.01)
*C01B 33/20* (2006.01)

(56) References Cited

U.S. PATENT DOCUMENTS

| | | |
|---|---|---|
| 2003/0070542 A1 | 4/2003 | Konrad |
| 2003/0129496 A1 | 7/2003 | Kasai et al. |
| 2005/0112054 A1 | 5/2005 | Eberman et al. |
| 2007/0212606 A1 | 9/2007 | Chang |
| 2008/0138709 A1* | 6/2008 | Hatta et al. ............ 429/221 |
| 2009/0130560 A1* | 5/2009 | Exnar et al. ............ 429/224 |
| 2010/0065787 A1* | 3/2010 | Armand et al. ............ 252/506 |
| 2010/0102270 A1 | 4/2010 | Jia et al. |
| 2010/0323231 A1 | 12/2010 | Sakai et al. |
| 2012/0070708 A1 | 3/2012 | Ohira et al. |
| 2012/0100429 A1* | 4/2012 | Sueki et al. ............ 429/221 |
| 2012/0264016 A1* | 10/2012 | Sueki et al. ............ 429/213 |

FOREIGN PATENT DOCUMENTS

| | | | |
|---|---|---|---|
| CA | 2 769 207 A1 | | 2/2011 |
| CN | 1410349 A | * | 4/2003 |
| JP | 2002-198050 | | 7/2002 |
| JP | 2004-014341 | | 1/2004 |
| JP | 2005-519451 | | 6/2005 |
| JP | 2008-311067 | | 12/2008 |
| JP | 2009-004371 | | 1/2009 |
| JP | 2012-089342 | | 5/2012 |
| WO | WO 02/27823 A1 | | 4/2002 |
| WO | WO 03/077335 | | 9/2003 |
| WO | WO 2009/124431 | * | 10/2009 |
| WO | WO 2010/046629 | * | 4/2010 |
| WO | WO 2010/134579 | | 11/2010 |

OTHER PUBLICATIONS

International Search Report for PCT/JP2011/062599, mailed Aug. 30, 2011.

Gaberseck et al. "Mass and charge transport in hierarchically organized storage materials", Example: Porous active materials with nanocoated walls of pores, *Solid state Iconics*, vol. 177, No. 35-36, 2006, pp. 3015-3022.

Wang et al., "A study on LiFePO$_4$ and its doped derivatives as cathode materials for lithium-ion batteries", *Journal of Power Sources*, 2006, vol. 159, No. 1, pp. 282-286.

Julien et al., Nanoscopic Scale Studies of LiFePO4 as Cathode Material in Lithium-Ion Batteries for HEV Application (Ionics (2007) 13:395-411).

Office Action issued in U.S. Appl. No. 13/275,858 dated Sep. 26, 2013.

Office Action issued in U.S. Appl. No. 13/416,169 dated Sep. 12, 2013.

* cited by examiner

METHOD FOR PRODUCING LITHIUM-CONTAINING COMPOSITE OXIDE

This application is the U.S. national phase of International Application No. PCT/JP2011/062599 filed 1 Jun. 2011 which designated the U.S. and claims priority to JP Patent Application Nos. 2010-126499 filed 2 Jun. 2010, 2010-126503 filed 2 Jun. 2010 and 2010-126504 filed 2 Jun. 2010, the entire contents of each of which are hereby incorporated by reference.

TECHNICAL FIELD

The present invention relates to a method for producing a lithium-containing composite oxide. In particular, it relates to a method for producing a lithium-containing composite oxide used as a positive electrode active material of a nonaqueous electrolyte secondary battery.

BACKGROUND ART

Lithium secondary batteries which are a type of commercially viable nonaqueous electrolyte secondary batteries have come into widespread use. Recently, lithium secondary batteries have attracted much attention not only as small-size batteries for use in portable electronic devices but also as large-capacity devices for installation in vehicles and electric power storage. With such trends, the requirements for safety, cost, battery life, etc., have become ever more stringent.

The main components of a lithium secondary battery are a positive electrode, a negative electrode, an electrolyte, a separator, and an outer casing. The positive electrode is constituted by a positive electrode active material, a conductive material, a current collector, and a binder (binding agent).

In general, layered transition metal oxides, a representative example of which is lithium cobaltate ($LiCoO_2$), are used as the positive electrode active material. However, layered transition metal oxides are likely to cause oxygen desorption at a relatively low temperature of about 150° C. in a fully charged state, and this oxygen desorption may lead to a thermal runaway reaction in the battery. Accordingly, if a battery that contains such a positive electrode active material is used in portable electronic devices, accidents such as batteries generating heat and setting on fire may occur.

Thus, there is high anticipation for lithium-containing composite oxides, such as lithium iron phosphate ($LiFePO_4$) having an olivine structure, that have a stable structure and do not release oxygen under abnormal conditions, and are safer than $LiCoO_2$. Lithium iron phosphate does not contain cobalt whose abundance in the Earth's crust is low and thus has an advantage that it is relatively inexpensive. Another advantage of lithium iron phosphate is that it is structurally more stable than layered transition metal oxides.

However, when lithium iron phosphate is used as a positive electrode active material, the discharge capacity decreases significantly with repeated charge-discharge cycles and there is a disadvantage that the battery life is short. This is because the positive electrode active material undergoes significant expansion and contraction due to lithium insertion/extraction during charging and discharging and gradually physically detaches from the current collector and the conductive material as the number of cycles increases, resulting in breaking of the positive electrode active material structure, an increase in amount of active materials not contributing to charging and discharging, and a decrease in discharge capacity. To address this issue, studies have been made on methods for suppressing expansion and contraction of the positive electrode active material by using a lithium-containing composite oxide having a lithium iron phosphate base structure subjected to element substitution (e.g., refer to PTL 1 and PTL 2).

CITATION LIST

Patent Literature

[PTL 1] Japanese Unexamined Patent Application Publication No. 2002-198050
[PTL 2] PCT Japanese Translation Patent Publication No. 2005-519451

SUMMARY OF INVENTION

Technical Problem

However, there is a problem with the solid state reaction method used in PTL 1 or 2 in that it is difficult to produce a lithium-containing composite oxide having a single-phase olivine structure due to the generation of impurities.

Accordingly, a method with which a lithium-containing composite oxide having a single-phase olivine structure is produced is needed.

An object of the present invention is to provide a method for producing a lithium-containing composite oxide with which a lithium-containing composite oxide having a single-phase olivine structure can be produced.

Solution to Problem

The inventors of the present invention have extensively studied lithium-containing composite oxides having an olivine structure and found that the battery life is improved when a lithium-containing composite oxide, $LiFePO_4$ having some of iron atoms and phosphorus atoms substituted with atoms of other elements is used as a positive electrode active material.

The present invention provides a method for producing a lithium-containing composite oxide represented by general formula (1) below, the method at least including a step of preparing a solution by dissolving a lithium source, an element M source, a phosphorus source, and an element X source that serve as source materials in a solvent, the phosphorus source being added after at least the element M source is dissolved; a step of gelating the resulting solution; and a step of calcining the resulting gel:

$$Li_xM_yP_{1-z}X_zO_4 \quad (1)$$

(where M represents at least one element selected from the group consisting of Fe, Ni, Mn, Zr, Sn, Al, and Y; X represents at least one element selected from the group consisting of Si and Al; and $0<x\leq2$, $0.8\leq y\leq1.2$, $0\leq z\leq1$).

Advantageous Effects of Invention

According to the present invention, the raw material elements can be homogeneously dispersed in the gel and thus a lithium-containing composite oxide having a single phase olivine structure can be produced while suppressing generation of impurities. As a result, the present invention can provide a positive electrode active material for lithium secondary batteries that offers high safety and high cost efficiency and are capable of extending battery life.

DESCRIPTION OF EMBODIMENTS

Figure 1:
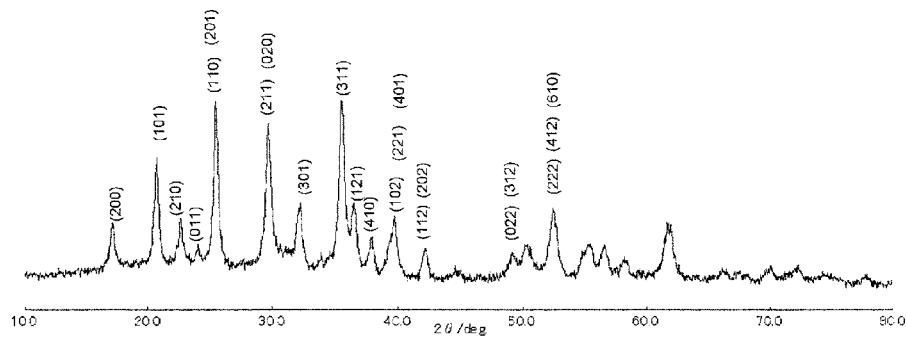
FIG. 1 is a diagram of an X-ray diffraction pattern showing the structure of a lithium-containing composite oxide obtained in Example 1.

Embodiments of the present invention will now be described in detail.

(1) Lithium-Containing Composite Oxide

A lithium-containing composite oxide to be produced in the present invention is represented by general formula (1) below:

$$Li_xM_yP_{1-z}X_zO_4 \quad (1)$$

In the formula, M represents at least one element selected from the group consisting of Fe, Ni, Mn, Zr, Sn, Al, and Y. When M is selected from this group, physical stress (volumetric contraction and expansion) of the lithium-containing composite oxide caused by repeated charging and discharging (insertion and extraction of Li) can be prevented and thus a positive electrode active material with a longer lifetime can be provided. M preferably includes Fe. When Fe is included, less expensive raw materials can be used in producing the lithium-containing composite oxide. For the element that can take various different valencies, the valence for defining "y" in general formula (1) above is an average value.

X represents at least one selected from the group consisting of Si and Al. In other words, both Si and Al may be selected simultaneously. When X is selected from this group, physical stress (volumetric contraction and expansion) of the lithium-containing composite oxide caused by repeated charging and discharging (insertion and extraction of Li) can be prevented and thus a positive electrode active material with a longer lifetime can be provided. Preferably, at least Si having a higher ionicity than Al is selected. When Si is selected, the bond between oxygen and metal M constituting the lithium-containing composite oxide can be further strengthened, and a positive electrode active material that can withstand physical stress can be provided.

In the formula, x is in the range of 0<x≤2. Furthermore, x increases or decreases depending on the types of other elements constituting the lithium-containing composite oxide and by charging and discharging. Preferably, x is in the range of 0.8≤x≤2.

In the formula, y is in the range of 0.8≤y≤1.2. Within this range, a lithium-containing composite oxide having an olivine structure capable of charging and discharging can be provided. Preferably, y is in the range of 0.9≤y≤1.1.

In the formula, z is in the range of 0≤z≤1. Within this range, a lithium-containing composite oxide having an olivine structure capable of charging and discharging can be provided. Preferably, z is in the range of 0.1≤z≤0.5.

Specific examples of the lithium-containing composite oxide include the following:
$Li_xFe_yP_{1-z}O_4$ (where 0.8≤x≤1.2, 0.8≤y≤1.2, z=0),
$Li_xNi_yP_{1-z}O_4$ (where 0.8≤x≤1.2, 0.8≤y≤1.2, z=0),
$Li_xMn_yP_{1-z}O_4$ (where 0.8≤x≤1.2, 0.8≤y≤1.2, z=0),
$Li_x(Fe,Ni)_yP_{1-z}O_4$ (where 0.8≤x≤1.2, 0.8≤y≤1.2, z=0),
$Li_x(Fe,Mn)_yP_{1-z}O_4$ (where 0.8≤x≤1.2, 0.8≤y≤1.2, z=0),
$Li_x(Fe,Zr)_yP_{1-z}O_4$ (where 0.8≤x≤1.2, 0.8≤y≤1.2, z=0),
$Li_x(Fe,Sn)_yP_{1-z}O_4$ (where 0.8≤x≤1.2, 0.8≤y≤1.2, z=0),
$Li_x(Fe,Y)_yP_{1-z}O_4$ (where 0.8≤x≤1.2, 0.8≤y≤1.2, z=0),
$Li_x(Fe,Ni)_yP_{1-z}Si_zO_4$ (where 0.8≤x≤1.2, 0.8≤y≤1.2, 0<z≤0.5),
$Li_x(Fe,Mn)_yP_{1-z}Si_zO_4$ (where 0.8≤x≤1.2, 0.8≤y≤1.2, 0<z≤0.5),
$Li_x(Fe,Zr)_yP_{1-z}Si_zO_4$ (where 0.8≤x≤1.2, 0.8≤y≤1.2, 0<z≤0.5),
$Li_x(Fe,Sn)_yP_{1-z}Si_zO_4$ (where 0.8≤x≤1.2, 0.8≤y≤1.2, 0<z≤0.5), and
$Li_x(Fe,Y)_yP_{1-z}Si_zO_4$ (where 0.8≤x≤1.2, 0.8≤y≤1.2, 0<z≤0.5).
When M is two or more elements, the atomic percentage of each element may take any value more than 0 at. % and less than 100 at. % relative to the total amount of M.

Particularly preferable examples of the lithium-containing composite oxide from the viewpoint of use as a positive electrode active material include the following:
$Li_x(Fe,Zr)_yP_{1-z}Si_zO_4$ (where 0.8≤x≤1.2, 0.8≤y≤1.2, 0<z≤0.5),
$Li_x(Fe,Sn)_yP_{1-z}Si_zO_4$ (where 0.8≤x≤1.2, 0.8≤y≤1.2, 0<z≤0.5),
$Li_x(Fe,Y)_yP_{1-z}Si_zO_4$ (where 0.8≤x≤1.2, 0.8≤y≤1.2, 0<z≤0.5),
$Li_x(Fe,Ti)_yP_{1-z}Si_zO_4$ (where 0.8≤x≤1.2, 0.8≤y≤1.2, 0<z≤0.5),
$Li_x(Fe,Nb)_yP_{1-z}Si_zO_4$ (where 0.8≤x≤1.2, 0.8≤y≤1.2, 0<z≤0.5), and
$Li_x(Fe,V)_yP_{1-z}Si_zO_4$ (where 0.8≤x≤1.2, 0.8≤y≤1.2, 0<z≤0.5).

A yet more preferable lithium-containing composite oxide is $LiFe_{1-\alpha}Zr_\alpha P_{1-2\alpha}Si_{2\alpha}O_4$ (where 0<α≤0.25).

Because Fe and Si are contained in the formula, physical stress (volumetric contraction and expansion) of the lithium-containing composite oxide caused by repeated charging and discharging (insertion and extraction of Li) can be prevented and a positive electrode active material with a longer lifetime can be provided. Because Fe is included, less expensive raw materials can be used in producing the lithium-containing composite oxide. Si has an action of further strengthening the bond between oxygen and iron and between oxygen and zirconium.

The lithium-containing composite oxide is usually used in the form of particles. The particle size of primary particles is 1 μm or less and preferably 10 nm to 1 μm in order to increase the efficiency of lithium ion insertion and extraction. A realistic lower limit of the primary particle size is about 10 nm from the viewpoint of the balance between the insertion/extraction efficiency and the production cost. The primary particle size can be measured by direct observation with a scanning electron microscope (SEM) or with a particle size distribution analyzer using a laser diffraction/scattering method.

The particle size of secondary particles is 100 µm or less and preferably 10 nm to 100 µm to increase the efficiency of lithium ion insertion and extraction. The secondary particle size can be measured by direct observation with SEM or with a particle size distribution analyzer using a laser diffraction/scattering method.

(2) Method for Producing Lithium-Containing Composite Oxide

The present invention provides a method for manufacturing a lithium-containing composite oxide represented by general formula (1) described above, the method at least including:

a step of preparing a solution by dissolving source materials in a solvent (hereinafter this step is referred to as a dissolving step); a step of gelating the obtained solution (hereinafter this step is referred to as a gelating step); and a step of calcining the resulting gel (hereinafter this step is referred to as a calcining step). If needed, a step of removing the solvent from the gel (hereinafter this step is referred to as a drying step) obtained in the gelating step, a step of grinding the resulting gel (hereinafter this step is referred to as a grinding step), and a step of mixing a substance which is a carbon source with the gel before calcination (hereinafter this step is referred to as a carbon source mixing step) may be provided.

(i) Dissolving Step

A lithium source, an element M source, a phosphorus source, and an element X source which are the source materials may each be any compound that dissolves in a solvent. Preferably, 10 mmol or more of each compound can be dissolved in 100 g of a solvent.

(Lithium Source)

The substance that serves as a lithium source may be any compound that can be used as a raw material of the positive electrode active material represented by general formula (1), is soluble in a solvent, and does not obstruct the production method of the present invention. An inorganic salt, a hydroxide, an organic acid salt, or a metal alkoxide of lithium or a hydrate of any of the salts may be used. Specific examples of the inorganic salt include salts of weak acids (hereinafter referred to as weak acid salts) such as lithium carbonate ($Li_2CO_3$), and salts of strong acids (hereinafter referred to as strong acid salts) such as lithium nitrate ($LiNO_3$) and lithium chloride (LiCl). Examples of the organic salt include weak acid salts such as lithium acetate ($LiCH_3COO$) and lithium oxalate $(COOLi)_2$. Examples of the metal alkoxide include lithium methoxide ($LiOCH_3$), lithium ethoxide ($LiOC_2H_5$), lithium-n-propoxide (LiO-n-$C_3H_7$), lithium-1-propoxide (LiO-i-$C_3H_7$), lithium-n-butoxide (LiO-n-$C_4H_9$), lithium-t-butoxide (LiO-t-$C_4H_9$), and lithium-sec-butoxide (LiO-sec-$C_4H_9$). The inorganic salts and the organic salts may be hydrates. Among these, weak acid salts and strong acid salts are preferable from the viewpoints of low cost and ease of preparing a homogeneous solution in an ambient atmosphere. In particular, lithium acetate or lithium nitrate is preferable. In the present invention, a "homogeneous solution" refers to a state in which generation of precipitates is not visually observed and separation into two or more phases does not occur.

A method for dissolving the lithium source in the case where iron and zirconium are used as the element M, silicon is used as the element X, and ethanol is used as the solvent is described below.

When an anhydride of a weak acid salt, which has low solubility in ethanol, is used as a lithium source, the anhydride is preferably dissolved after a hydrate of a salt of an iron source or a hydrate of a salt of a zirconium source is dissolved. In the case where the anhydride is to be dissolved before adding a hydrate of a salt of an iron source or a hydrate of a salt of a zirconium source, the anhydride is preferably dissolved in water in advance. Alternatively, water in an amount needed to dissolve the anhydride of the weak acid salt may be preliminarily added to ethanol. The amount of water needed to dissolve the anhydride of the weak acid salt is preferably 1 to 100 times and more preferably 4 to 20 times the number of moles of Li.

The anhydride of the weak acid salt may be used in any combination with an iron source, a zirconium source, and a silicon source and a homogeneous solution can be obtained by dissolving these in any order. The obtained homogeneous solution may be reacted in advance and then the remaining raw materials may be added thereto. The anhydride of the weak acid salt is preferably preliminarily reacted with a hydrate of a salt of an iron source. When the anhydride of the weak acid salt is preliminarily reacted with the hydrate of a salt of an iron source, generation of precipitates on addition of phosphoric acid can be suppressed.

The anhydride of the weak acid salt is preferably preliminarily reacted with tetramethoxysilane or tetraethoxysilane and more preferably with tetramethoxysilane. As for the order of mixing in this process, preferably, the anhydride of the weak acid salt is dissolved in water, ethanol is added to the resulting solution, and then tetramethoxysilane or tetraethoxysilane is added thereto. After these substances are mixed, the resulting mixture is heated to 30° C. to 60° C. to further accelerate the reaction. The time of heating is not particularly limited but is desirably about 30 minutes to 12 hours. When the anhydride of the weak acid salt and the silicon source are reacted with each other in advance, generation of impurities after calcining and substitution of Li sites with Fe in the lithium-containing composite oxide can be suppressed.

(Element M Source)

The substance that serves as an element M source may be any compound that can be used as a raw material of the positive electrode active material represented by general formula (1), is soluble in the solvent, and does not obstruct the production method of the present invention. An inorganic salt, a hydroxide, an organic salt, or a metal alkoxide of the element M or a hydrate of any of these salts can be used. As mentioned above, M is at least one element selected from the group consisting Fe, Ni, Mn, Zr, Sn, Al, and Y. M preferably includes at least Fe. Examples of the iron source include inorganic salts such as weak acid salts, e.g., iron(II) carbonate ($Fe(CO_2)$), and strong acid salts, e.g., iron(II) nitrate (Fe$(NO_3)_2$), iron(III) nitrate (Fe$(NO_3)_3$), iron (II) chloride ($FeCl_2$), and iron(III) chloride ($FeCl_3$). Examples of the organic salt include weak acid salts such as iron(II) oxalate ($FeC_2O_4$), iron(III) oxalate (Fe$_2(C_2O_4)_3$), iron(II) acetate (Fe$(CH_2COO)_2$), and iron(III) acetate (Fe$(CH_2COO)_2$). Hydrates of strong acid salts are preferred, and among these, a nonahydrate of iron(III) nitrate is preferred.

The method for dissolving the element M source in the case where iron and zirconium are used as the element M, silicon is used as the element X, and ethanol is used as the solvent is described below.

A hydrate of a strong acid salt may be used in any combination with a lithium source, a zirconium source, and a silicone source and a homogeneous solution can be obtained by dissolving these in any order. The resulting homogeneous solution may be reacted in advance and then the remaining raw materials may be added thereto. The hydrate of the strong acid salt is preferably added to the solvent before the phosphoric acid. Since generation of impurities after calcination can be suppressed by preliminarily inducing the reaction of the hydrate of the strong acid salt alone, the hydrate of the strong acid salt may be dissolved in ethanol alone and then reacted by applying heat to a degree that does not produce precipitates.

(Zirconium Source)

Examples of the zirconium source include inorganic salts such as zirconium halides, e.g., zirconium chloride ($ZrCl_4$), zirconium bromide ($ZrBr_4$), and zirconium iodide ($ZrI_4$), and oxyzirconium salts, e.g., zirconium oxychloride ($ZrOCl_2$) and zirconium oxynitrate ($ZrO(NO_2)_2$). Examples of the metal alkoxide include zirconium methoxide ($Zr(OCH_3)_4$), zirconium ethoxide ($Zr(OC_2H_5)_4$), zirconium-n-propoxide ($Zr(O-n-C_3H_7)_4$), zirconium-1-propoxide ($Zr(O-i-C_3H_7)_4$), zirconium-n-butoxide ($Zr(O-n-C_4H_8)_4$), zirconium-t-butoxide ($Zr(O-t-C_4H_8)_4$), and zirconium-sec-butoxide ($Zr(O-t-C_4H_8)_4$). Zirconium halides are preferable and among these, zirconium chloride is preferable.

A zirconium halide may be used in any combination with a lithium source, an iron source, and a silicon source and a homogeneous solution can be obtained by dissolving these in any order. The zirconium halide is preferably reacted with an iron source, which is a hydrate of a strong acid salt, in advance. When the zirconium halide is reacted with the iron source, hydrate of a strong acid salt in advance, formation of impurities such as zirconia and zirconium phosphate after calcining can be suppressed. The zirconium halide is preferably preliminarily reacted with tetramethoxysilane or tetraethoxysilane and particularly preferably with tetramethoxysilane. When the zirconium halide is preliminarily reacted with a silicon source, generation of impurities after calcining and substitution of Li sites with Fe in the lithium-containing composite oxide can be suppressed.

(Phosphorus Source)

A substance used as a phosphorus source may be any compound that can be used as a raw material of the positive electrode active material represented by general formula (1), is soluble in the solvent, and does not obstruct the production method of the present invention. Specific examples thereof include phosphoric acid ($H_3PO_4$), ammonium hydrogen phosphate ($(NH_4)_2HPO_4$), and ammonium dihydrogen phosphate ($NH_4H_2PO_4$). Among these, phosphoric acid is preferable.

The method for dissolving the phosphorus source in the case where iron and zirconium are used as the element M, silicon is used as the element X, and ethanol is used as the solvent is described below.

Phosphoric acid must be added after at least the lithium source, the iron source, and the zirconium source are dissolved. This is because precipitates are generated when phosphoric acid is mixed with an anhydride of a weak acid salt of lithium or a zirconium halide. When adding the phosphoric acid, the phosphoric acid may be added in excess. When the phosphoric acid is added in excess, generation of impurities after calcining and substitution of the Li sites with Fe in the lithium-containing composite oxide can be suppressed. When phosphoric acid is to be added in excess, the amount of phosphoric acid to be added in excess may be within the range of 5 to 20 wt % and more preferably within the range of 5 to 15 wt % relative to the stoichiometric amount of phosphoric acid.

(Element X Source)

The substance that is used as the element X source may be any compound that can be used as a raw material of the positive electrode active material represented by general formula (1), is soluble in the solvent, and does not obstruct the production method of the present invention. Metal alkoxides of the element X can be used. X is at least one element selected from the group consisting of Si and Al and is preferably Si. Examples of the silicon source include various silicon alkoxides such as tetraethoxysilane ($Si(OC_2H_5)_4$), tetramethoxysilane ($Si(OCH_3)_4$), methyltriethoxysilane ($CH_3Si(OC_2H_5)_3$), methyltrimethoxysilane ($CH_3Si(OCH_3)_3$), ethylmethoxysilane ($C_2H_5Si(OCH_3)_3$), and ethyltriethoxyslilane ($C_2H_5Si(OC_2H_5)_3$). Tetraethoxysilane or tetramethoxysilane is preferable.

A method for dissolving the element X source in the case where iron and zirconium are used as the element M, silicon is used as the element X, and ethanol is used as the solvent is described.

A silicon alkoxide may be used in any combination with a lithium source, an iron source, and a zirconium source and a homogeneous solution can be obtained by dissolving these in any order. In order to accelerate reaction of silicon alkoxide, water may be added. The amount of water added is 1 to 100 times and more preferably 2 to 20 times the number of moles of silicon. Adding water can accelerate hydrolysis and promote the reaction. The silicon alkoxide may be reacted with phosphoric acid in advance. When tetraethoxysilane is used, the reaction is preferably carried out at 40° C. to 80° C. and more preferably at 50° C. to 80° C. When tetramethoxysilane is used, the reaction is preferably carried out at 20° C. to 60° C. When tetramethoxysilane and an anhydride of a weak acid salt serving as a lithium source are to be reacted, preferably, (number of moles of Li in lithium source/number of moles of Si in silicon source)$\geq 2$.

At least one alcohol selected from the group consisting of methanol, ethanol, n-propanol, isopropanol, and n-butanol is used as the solvent. Ethanol is preferable. In order to dissolve the source materials that have low solubility in alcohol, a mixed solvent containing water may be used if needed. The amount of solvent is not particularly limited as long as all of the source materials can be dissolved. However, considering the recovery cost of the solvent, the amount of solvent is preferably within the molar ratio range of 1 to 100 and preferably 2 to 15 with respect to the total number of moles of all source materials.

(Dissolving Method)

In the dissolving step, precipitates may be generated and a homogeneous solution may not be formed depending on the order in which the source materials are dissolved. Accordingly, the order in which the source materials are dissolved is critical.

The case in which iron and zirconium are used as the element M and silicon is used as the element X is described below. As discussed above, precipitates occur when phosphoric acid is mixed with a weak acid salt of the lithium source, in particular, an anhydride of a salt, or a zirconium source, and zirconium ions are stabilized by the presence of the iron ions. Accordingly, the phosphorus source needs to be dissolved in the solvent after at least the lithium source, the iron source, and the zirconium source are dissolved in the solvent. Thus, a solution in which all source materials are homogeneously dissolved can be prepared without generating precipitates. As a result, the raw material elements can be homogeneously dispersed in the gel and a lithium-containing composite oxide that has a single-phase olivine structure can be produced while suppressing generation of impurities.

The silicon source may be dissolved before dissolving the phosphorus source or after dissolving the phosphorus source.

This method is suitable for producing a lithium-containing composite oxide represented by the above-described general formula:

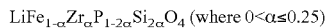

$$\text{LiFe}_{1-\alpha}\text{Zr}_\alpha\text{P}_{1-2\alpha}\text{Si}_{2\alpha}\text{O}_4 \text{ (where } 0<\alpha\leq 0.25)$$

In this invention, the order in which the source materials are dissolved means the order in which the source materials are added in the case where the source materials are sequentially added to the solvent. However, in the case where two or more solutions in which the raw materials are dissolved in the solvent are prepared and mixed together, this order refers to the order in which the solutions are mixed together.

The order in which the solvent in which the lithium source, the iron source, and the zirconium source are dissolved is prepared may be any order as long as zirconium ions can be stabilized by the iron ions. Examples of the method for stabilizing zirconium ions with iron ions include a method that includes dissolving a hydrate of a strong acid salt of iron in a solvent and then dissolving a zirconium halide in the resulting solution, a method that includes dissolving a zirconium halide in a solvent and then dissolving a hydrate of a strong acid salt of iron in the resulting solution, and a method that includes dissolving a hydrate of a strong acid salt of iron and a zirconium halide in a solvent simultaneously. The order in which the iron source and the zirconium source are dissolved is not particularly limited. Either one may be dissolved first or both may be dissolved simultaneously.

When an anhydride of a salt, e.g., lithium acetate, is used as the lithium source, the lithium salt does not dissolve in the solvent unless water is contained in the solvent. Accordingly, in the case where an anhydride of a salt is used as a lithium source, the lithium salt is preferably added after a hydrate of an iron salt and a hydrate of a zirconium salt are dissolved in the solvent to dissolve the lithium salt in the solvent.

The source materials may be dissolved in the solvent while being heated at room temperature or higher. The heating temperature is preferably 30° C. to 80° C. and more preferably 30° C. to 60° C.

Although an example of using iron and zirconium as the element X and silicon as the element X has been described in the description of the dissolving step above, the combination of the element M and the element X is not particularly limited as long as M and X are included in general formula (1) above and all of the source materials can be dissolved in the solvent homogeneously.

(ii) Gelating Step

In this step, the solution obtained in the dissolving step is gelated. The inventors consider the gelation to be achieved through an increase in the viscosity of the solution caused by Li, Fe, Zr, P, and Si bonding to each other via oxygen atoms to form aggregates which precipitate as fine particles several nanometers to several tens of nanometers in size in the gel.

In the gelating step, the solution may be left to stand or may be stirred. In order to accelerate gelation, the solution obtained in the dissolving step may be heated to a temperature in the range of room temperature to the boiling point of the solvent used, preferably 30° C. to 80° C., and more preferably 40° C. to 60° C. The heating time is 10 minutes to hours and preferably 30 minutes to 24 hours. Since heating the solution will accelerate the gelation and shorten the time needed for gelation, the production cost can be reduced. Moreover, heating also achieves an effect of suppressing phase separation in the gel after gelation and inhibiting the generation of impurities.

(iii) Drying Step

In this step, the remaining solvent is removed from the gel that has been gelated. The solvent may be removed by, for example, leaving the gel to stand at room temperature, heating the gel to 30° C. to 80° C., or placing gel in a chamber and evacuating the chamber with a rotary pump or the like. A solvent having a higher volatility than the solvent used in preparing the solution or a solvent having a different surface tension may be used to conduct solvent exchange and then the solvent may be removed by the same method mentioned above. Examples of the solvent that can be used in the solvent exchange include toluene, benzene, hexane, tetrahydrofuran, isopropanol, and mixed solvents thereof. Alternatively, the gel obtained in this step may be immersed in carbon dioxide in a supercritical state to remove the solvent by extraction. The removed solvent is preferably recovered and reused from the industrial viewpoint.

(iv) Grinding Step

In this step, the obtained gel is mechanically ground. The grinding method is not particularly limited and may be carried out while heating, cooling, and controlling atmosphere as needed.

Examples of the grinding technique include, but are not limited to, a planetary ball mill, a ball mill, a bead mill, a vibrating mill, a pin mill, an atomizer, a homogenizer, a rotary mill, a roller mill, a hammer mill, and a jet mill.

The average particle size of the gel after grinding is 0.1 μm to 50 μm and preferably 0.2 to 10 μm. This is because if the average particle size is greater than 50 μm, sufficient reduction does not occur during calcining and impurities such as $Fe_2O_3$ and $ZrO_2$ are likely to be generated. At an average particle size smaller than 0.1 μm, the surface area increases and thus the particles react with moisture in the air or adsorb carbon dioxide and the like, thereby readily generating impurities. Moreover, it takes a longer time to grind, which is not practical.

Grinding the gel can decrease the contact area between the gels and suppress particle growth. As a result, it becomes possible to suppress aggregation of primary particles and secondary particles. Thus, the particle size of the lithium-containing composite oxide can be controlled without grinding the lithium-containing composite oxide after calcining and the crystallinity of the lithium-containing composite oxide remains undegraded.

(v) Carbon Source Mixing Step

A saccharide, oil or fat, or a synthetic resin material may be mixed with the ground gel. When these compounds are carbonized during calcining, carbon coatings form on the surfaces of the lithium-containing composite oxide particles and the electrical conductivity of the particles can be improved. Examples of the saccharide include sucrose and fructose. Examples of the synthetic resin material include polyethers such as polyethers, e.g., polyethylene glycol and polypropylene glycol, polyvinyl alcohol, polyacrylamide, carboxymethyl cellulose, and polyvinyl acetate.

(vi) Calcining Step

In this step, the obtained gel is calcined to obtain a lithium-containing composite oxide. Calcination is conducted in the temperature range of 400° C. to 700° C. and preferably 400° C. to 600° C. for 1 to 24 hours. The atmosphere during calcining may be an inert atmosphere (argon, nitrogen, or vacuum atmosphere, for example) or a reducing atmosphere (a hydrogen-containing inert gas or carbon monoxide atmosphere, for example). In order to conduct uniform calcining, the gel may be stirred. In the case where toxic gas such as NOx, SOx, or chlorine is generated during calcining, a unit for removing the toxic gas may be provided.

(vii) Other Steps

The obtained lithium-containing composite oxide may be subjected to a grinding step and/or a classifying step to adjust the particle size to desired size as needed.

(3) Usage

The obtained lithium-containing composite oxide can be used as a positive electrode active material of a nonaqueous electrolyte secondary battery. The positive electrode active material may contain other oxides such as $LiCoO_2$, $LiNiO_2$, $LiFeO_2$, $LiMnO_2$, $LiMn_2O_4$, $Li_2MnO_3$, $LiCoPO_4$, $LiNiPO_4$, $LiMnPO_4$, and $LiFePO_4$ in addition to the lithium-containing composite oxide.

The nonaqueous electrolyte secondary battery includes a positive electrode, a negative electrode, a nonaqueous electrolyte, and a separator. The materials constituting these components are described below.

(a) Positive Electrode

A positive electrode can be made by using a known method. For example, a positive electrode can be made by kneading and dispersing a positive electrode active material, a conductive material, and a binder in an organic solvent to obtain a paste and applying the paste to a current collector. Note that when the lithium-containing composite oxide obtained has a sufficiently high electrical conductivity, the conductive material is not necessarily added.

Examples of the binder that can be used include polytetrafluoroethylene, polyvinylidene fluoride, polyvinyl chloride, ethylene propylene diene polymer, styrene-butadiene rubber, acrylonitrile-butadiene rubber, fluorine rubber, polyvinyl acetate, polymethyl methacrylate, polyethylene, nitrocellulose, and styrene-butadiene rubber. If needed, a thickener such as carboxymethyl cellulose can be used.

Examples of the conductive material that can be used include acetylene black, natural graphite, artificial graphite, and needle coke.

Examples of the current collector that can be used include foamed (porous) metals having continuous pores, honeycomb-structure metals, sintered metals, expanded metals, nonwoven cloths, plates, perforated plates, and foils.

Examples of the organic solvent include N-methyl-2-pyrrolidone, toluene, cyclohexane, dimethylformamide, dimethylacetamide, methyl ethyl ketone, methyl acetate, methyl acrylate, diethyltriamine, N,N-dimethylaminopropylamine, ethylene oxide, and tetrahydrofuran. When a water-soluble binder is used as the binder, water may be used as the solvent.

The thickness of the positive electrode is preferably about 0.01 to 20 mm. If the positive electrode is too thick, the electrical conductivity is degraded and if too thin, the capacity per unit are is decreased, which is not preferable. The positive electrode obtained by application and drying may be compacted by using a roller press or the like in order to increase the packing density of the active material.

(b) Negative Electrode

The negative electrode can be made by a known method. For example, a negative electrode can be made by mixing a negative electrode active material, a binder, and a conductive material, forming the resulting mixed powder into a sheet, and press-bonding the obtained sheet onto a current collector, e.g., a stainless steel or copper mesh current collector. Alternatively, the negative electrode may be made by using the method that uses a paste as described in (a) Positive electrode above. In such a case, the negative electrode can be made by kneading and dispersing a negative electrode active material, a conductive material, and a binder in an organic solvent to obtain a paste, and applying the paste onto a current collector.

A known material can be used as the negative electrode active material. In order to constitute a high-energy-density battery, a material whose potential for lithium insertion/extraction is close to the potential of the metallic lithium precipitation/dissolution is preferred. Typical examples thereof include carbon material such as natural and artificial graphite having granular shape (flake-shape, lump-shape, fiber-shape, whisker-shape, spherical, ground particle-shape etc.).

Examples of the artificial graphite include those obtained by graphitizing mesocarbon microbeads, mesophase pitch powder, and isotropic pitch powder. Graphite particles having amorphous carbon adhered to the surfaces can also be used. Of these, natural graphite is preferred since it is inexpensive, is close to the redox potential of lithium, and is capable of offering a high-energy-density battery.

A lithium transition metal oxide, a lithium transition metal nitride, a transition metal oxide, a silicon oxide, and the like can also be used as the negative electrode active material. Among these, $Li_4Ti_5O_{12}$ is preferable since it has high potential flatness and undergoes little volumetric changes during charging and discharging.

(c) Nonaqueous Electrolyte

An organic electrolyte, a gel electrolyte, a polymer solid electrolyte, an inorganic solid electrolyte, a molten salt, or the like can be used as the nonaqueous electrolyte, for example.

Examples of the organic solvent contained in the organic electrolyte include cyclic carbonates such as propylene carbonate (PC), ethylene carbonate (EC), and butylene carbonate; linear carbonates such as dimethyl carbonate (DMC), diethyl carbonate (DEC), ethyl methyl carbonate, and dipropyl carbonate; lactones such as γ-butyrolactone (GBL) and γ-valerolactone; furans such as tetrahydrofuran and 2-methyltetrahydrofuran; ethers such as diethyl ether, 1,2-dimethoxyethane, 1,2-diethoxyethane, ethoxy methoxy ethane, and dioxane; and dimethyl sulfoxide, sulfolane, methyl sulfolane, acetonitrile, methyl formate, and methyl acetate. These may be used alone or in combination as a mixture.

Cyclic carbonates such as PC, EC, and butylene carbonate are preferred as the solvent to be mixed with GBL since they have a high boiling point.

Examples of the electrolyte salt contained in the organic electrolyte include lithium salts such as lithium fluoroborate ($LiBF_4$), lithium hexafluorophosphate ($LiPF_6$), lithium trifluoromethanesulfonate ($LiCF_3SO_3$), lithium trifluoroacetate ($LiCF_3COO$), and lithium bis(trifluoromethanesulfone)imide ($LiN(CF_3SO_2)_2$). These may be used alone or in combination as a mixture. The salt concentration in the electrolyte is preferably 0.5 to 3 mol/l.

(d) Separator

A known material such as a porous material or a nonwoven cloth can be used as the separator. The material of the separator is preferably one that does not dissolve or swell in the organic solvent in the electrolyte. Specific examples thereof include polyester-based polymers, polyolefin-based polymers (e.g., polyethylene and polypropylene), ether-based polymers, and glass fibers.

(e) Other Components

Any of various known material can be used without limitation in other components such as battery casing.

(f) Method for Producing Secondary Battery

A secondary battery includes, for example, a laminate constituted by a positive electrode, a negative electrode, and a separator interposed between the electrodes. The laminate may have a rectangular strip shape in plan view. In the case of producing a cylinder-type or flat-type battery, the laminate may be wound into a roll.

One or more laminates are inserted into the interior of a battery casing. Usually, the positive electrode and the negative electrode are connected to external conductive terminals of the battery. Then the battery casing is sealed to isolate the positive electrode, the negative electrode, and the separator from outside air.

In the case of sealing a cylindrical battery, generally, a lid with a resin packing is fitted into an open portion of the battery casing and the lid is crimped to the battery casing. In the case of sealing a prismatic battery, a method with which a lid that is composed of a metal plate is attached to the open portion and welded can be employed. In addition to these methods, a method of performing sealing with a bonding agent and a method of performing fixing using bolts through a gasket can also be employed. Furthermore, a method of performing sealing with a laminate film constituted by a metal foil bonded with a thermoplastic resin can also be used. During sealing, an open portion through which an electrolyte may be poured can be formed. When an organic electrolyte is used, the organic electrolyte is poured through the open portion and then the open portion is sealed. Electricity may be supplied prior to sealing so as to remove generated gas.

EXAMPLES

The present invention will now be described in further detail by way of Examples which do not limit the scope of the present invention.

Example 1 i. Dissolving Step

An iron source, a lithium source, a zirconium source, a silicon source, and a phosphorus source were dissolved in a solvent in that order as described below.

An iron source $Fe(NO_3)_3 \cdot 9H_2O$ was weighed and added to ethanol whose molar amount was 30 times the molar amount of Li and the resulting mixture was stirred until complete dissolution was achieved. After confirming the complete dissolution, a lithium source $LiCH_3COO$, a zirconium source $ZrCl_4$, and a silicon source $Si(OC_2H_5)_4$ were weighed and sequentially dissolved in the solution in that order to prepare a homogeneous solution. Lastly, a phosphorus source $H_3PO_4$ (85 wt %) was weighed and added and stirring was conducted until the solution was homogeneous. These source materials were weighed so that Li:Fe:Zr:P:Si=1:0.875:0.125:0.75:0.25 (molar ratio) where the amount of the lithium source $LiCH_3COO$ was 0.9899 g.

ii. Gelating Step

The homogeneous solution stirred at room temperature for 1 hour was stored in a 60° C. constant-temperature chamber for 24 hours to induce gelation. During gelation, the container was covered with a lid to suppress evaporation of the solvent.

iii. Drying Step

The lid of the container containing the gel obtained in the gelating step was opened, and the solvent was allowed to evaporate by leaving the container open overnight in a 60° C. constant-temperature chamber.

iv. Grinding Step

The gel obtained in the drying step was ground with a planetary ball mill. The grinding conditions using the planetary ball mill were that the treatment was conducted for 1 hour at 400 rpm with zirconia balls 10 mm in diameter.

v. Carbon Source Mixing Step

To the ground precursor, a carbon source dissolved in water was added. Sucrose was used as the carbon source. The amount added was 15 wt % relative to the weight of the precursor. The precursor to which sucrose was added was dried and then ground with a mortar.

vi. Calcining Step

The precursor obtained in the grinding step was calcined for 12 hours at 550° C. The calcining process included evacuating the interior of the furnace, flowing nitrogen gas into the furnace, a nitrogen flow, and conducting heating at a heating rate of 200° C./h. The cooling rate was the rate at which the furnace cooled.

(Measurement of Average Particle Size of Gel after Grinding in the Grinding Step)

The average particle size of the gel after grinding was determined by the following method.

About 1 mg of the ground gel was scattered on a flat glass plate, the glass plate was set in an optical microscope BX60M produced by Olympus Corporation, and an image of gel particles was input to personal computer via a CCD camera. A region 100 μm in length and 200 μm in width was cut out from the viewed area of the image, and the threshold of the contrast of the image was adjusted to allow the contours of the individual particles to be extracted. Based on this contour data, the average of the major axis and the minor axis of each particle was determined and assumed to be the particle size of that particle. The same calculation was conducted for all of the particles within the region and the particle size distribution in the region was determined. The same operation was conducted 10 times by changing the region of the image to be measured and all distributions were integrated. Based on the integrated particle size distribution, the particle size at a point at which the area on the small size side of that point is 50% of the total area was assumed to be the average particle size (hereinafter defined to be D50). D50 of this example was 25.6 μm.

(Obtaining Powder X-Ray Diffraction Pattern)

The obtained composite oxide was analyzed with a powder X-ray diffractometer MiniFlex II produced by Rigaku Co., Ltd., to obtain a powder X-ray diffraction pattern. The results are shown in FIG. 1. Generation of a crystal phase having an olivine structure and absence of peaks attributable to impurities such as $Fe_2O_3$ and $ZrO_2$ were confirmed.

(Evaluation of Battery Characteristics)

About 1 g of the obtained positive electrode active material was weighed, ground in an agate mortar, and mixed with about 10 wt % of acetylene black (trade name: DENKA BLACK produced by Denki Kagaku Kogyo Kabushiki Kaisha) as the electronic conductor and about 10 wt % of polyvinylidene fluoride resin powder as a binder relative to the weight of the positive electrode active material. The resulting mixture was dispersed in a solvent such as N-methyl-2-pyrrolidone to prepare slurry, and the slurry was applied to both sides of an aluminum foil having a thickness of 20 μm by a doctor blade method. The amount applied was about 5 mg/cm². This electrode was dried and pressed to obtain a positive electrode.

About 30 ml of an ethylene/carbonate (1:2) electrolyte in which 1 mmol/l of $LiPF_6$ had been dissolved was placed in a 50 ml beaker and a beaker cell that used the positive electrode 2 cm×2 cm in size, a metallic lithium reference electrode, and a metallic lithium counter electrode was made.

This cell was charged for the first time in a 25° C. environment. The charge current was 0.1 mA and charging was terminated when the potential of the cell reached 4 V. Upon completion of charging, discharge was conducted at 0.1 mA and terminated when the potential of the cell reached 2.0 V. The capacity observed thereat was assumed to be the observed capacity of that cell. The results are shown in Table 1. In this example, a capacity as high as 110.3 mAh/g was obtained.

Comparative Example 1

Into an agate mortar, 15 mmol of lithium acetate ($LiCH_3COO$) as a lithium source, 10.50 mmol of iron oxalate dihydrate ($FeC_2O_4.2H_2O$) as an iron source, 4.50 mmol of zirconium oxychloride ($ZrOCl_2$) as a zirconium source, 11.25 mmol of ammonium dihydrogen phosphate ($(NH_4H_2PO_4)$) as a phosphorus source, and 3.75 mmol of $SiO_2$ powder as a silicon source were weighed and added, and ground until the mixture was homogeneous. The molar ratio of the sample was Li:Fe:Zr:P:Si=1:0.875:0.125:0.75:0.25. Relative to the weight of the $LiFe_{0.875}Zr_{0.125}P_{0.750}Si_{0.250}O_4$ expected to be obtained, 10 wt % of sucrose (carbon source) was added, and the raw materials were mixed and ground until the mixture was homogeneous. The resulting powder was calcined in a nitrogen atmosphere at 600° C. for 12 hours.
(Obtaining Powder X-Ray Diffraction Pattern)

Figure 2:
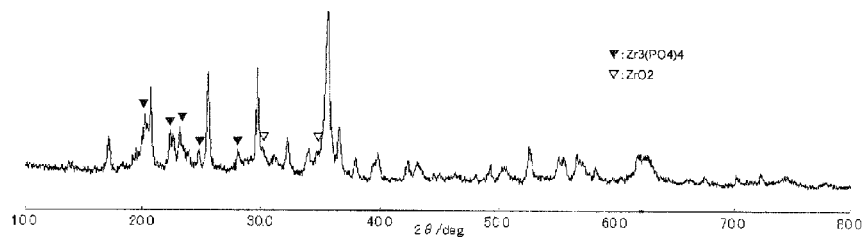
FIG. 2 is a diagram of an X-ray diffraction pattern showing the structure of a lithium-containing composite oxide obtained in Comparative Example 1.

The powder X-ray diffraction pattern of the resulting composite oxide was obtained by the same method as in Example 1. The results are shown in FIG. 2. Peaks attributable to $Zr_3(PO_4)_4$ and $ZrO_2$ were detected and generation of impurities, $Zr_3(PO_4)_4$ and $ZrO_2$, was confirmed.

A cell was made as in Example 1 but by using the obtained lithium-containing composite oxide as the positive electrode active material and the battery characteristics thereof were evaluated. The results are shown in Table 1. In this comparative example, a capacity of only about 56.7 mAh/g was obtained.

Comparative Example 2

The same method as in Example 1 was used except that in the grinding step, the grinding conditions using the planetary ball mill were changed to 1 minute at 400 rpm. The average particle size of the gel after grinding was 60.5 μm.
(Obtaining X-Ray Diffraction Pattern)

Figure 3:
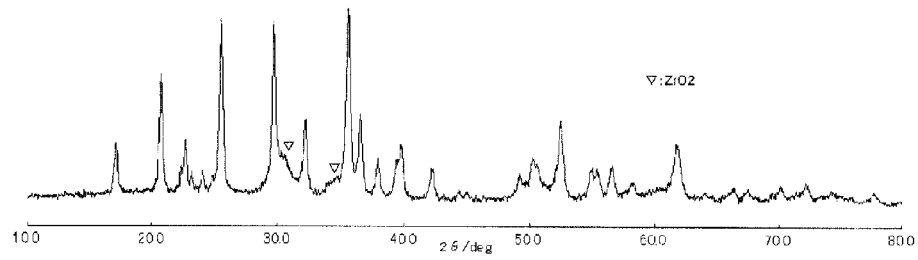
FIG. 3 is a diagram of an X-ray diffraction pattern showing the structure of a lithium-containing composite oxide obtained in Comparative Example 2.

The powder X-ray diffraction pattern of the resulting composite oxide was obtained as in Example 1. The results are shown in FIG. 3. Peaks attributable to $ZrO_2$ were detected, showing generation of an impurity, $ZrO_2$. Since peaks attributable to $ZrO_2$ were not detected in Example 1, it was found that generation of the impurity $ZrO_2$ can be suppressed by adjusting the average particle size of the gel in the grinding step to 50 μm or less.

A cell was made as in Example 1 by using the obtained lithium-containing composite oxide as a positive electrode active material and the battery characteristics were evaluated. The results are shown in Table 1. In this comparative example, a capacity of only about 58.9 mAh/g was obtained.

|  | Capacity (mAh/g) |
| --- | --- |
| Example 1 | 110.3 |
| Comparative Example 1 | 56.7 |
| Comparative Example 2 | 58.9 |

Example 2 i. Dissolving Step

An iron source, a lithium source, a zirconium source, a silicon source, and a phosphorus source were dissolved in a solvent in that order as described below.

An iron source $Fe(NO_2)_3.9H_2O$ was weighed and added to ethanol whose molar amount was 30 times the molar amount of Li and the resulting mixture was stirred until complete dissolution was achieved. After confirming the complete dissolution, a lithium source $LiCH_3COO$, a zirconium source $ZrCl_4$, and a silicon source $Si(OC_2H_5)_4$ were weighed and sequentially dissolved in the solution in that order to prepare a homogeneous solution. Lastly, a phosphorus source $H_3PO_4$ (85 wt %) was weighed and added and the resulting mixture was stirred until the solution was homogeneous. These source materials were weighed so that Li:Fe:Zr:P:Si=1:0.875:0.125: 0.75:0.25 (molar ratio) where the amount of the lithium source $LiCH_3COO$ was 0.9899 g. The obtained homogeneous solution was stirred at room temperature for 1 hour using a stirrer.

ii. Gelating Step

The homogeneous solution stirred at room temperature for 1 hour was stored in a 60° C. constant-temperature chamber for 24 hours to induce gelation. During gelation, the container was covered with a lid to suppress evaporation of the solvent.

iii. Drying Step

The lid of the container containing the gel obtained in the gelating step was opened, and the solvent was allowed to evaporate by leaving the container open overnight in a 60° C. constant-temperature chamber.

iv. Grinding Step

A precursor obtained by drying the gel was ground with a mortar. The average particle size of the gel after grinding was 49.2 μm.

v. Carbon Source Mixing Step

A carbon source dissolved in water was added to the ground precursor. Sucrose was used as the carbon source. The amount added was 15 wt % relative to the weight of the precursor. The precursor to which sucrose was added was dried and then ground with a mortar.

vi. Calcining Step

The precursor obtained in the grinding step was calcined for 12 hours at 550° C. The calcining process included evacuating the interior of the furnace, flowing nitrogen gas into the furnace, and conducting heating at a heating rate of 200° C./h. The cooling rate was the rate at which the furnace cooled.
(Results)

Figure 4:
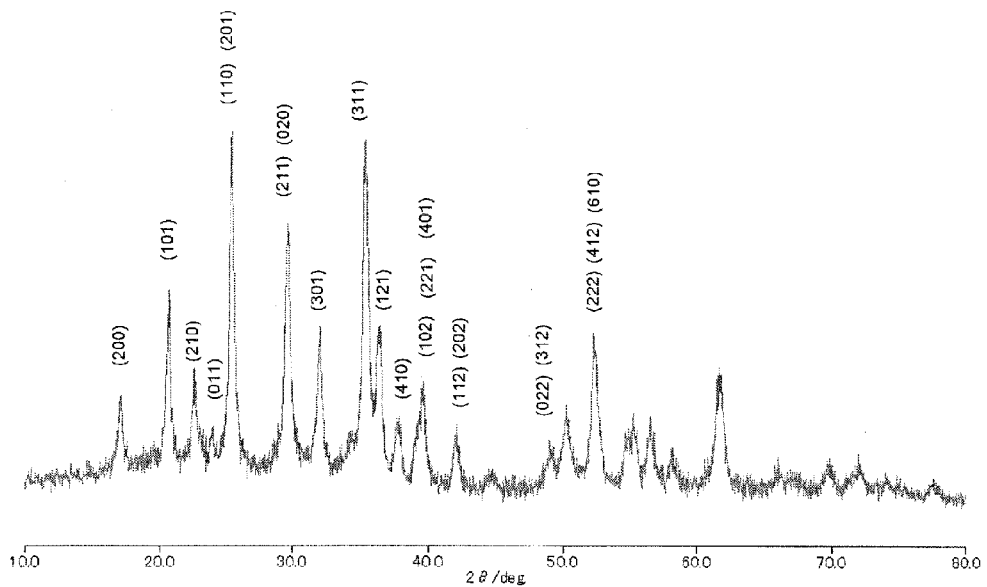
FIG. 4 is a diagram of an X-ray diffraction pattern showing the structure of a lithium-containing composite oxide obtained in Example 2.

The obtained composite oxide was analyzed with a powder X-ray diffractometer MiniFlex II produced by Rigaku Co., Ltd., to obtain a powder X-ray diffraction pattern. The results are shown in FIG. 4. Generation of a crystal phase having an olivine structure and absence of peaks attributable to impurities such as $ZrO_2$ were confirmed.

Example 3

A lithium-containing composite oxide was made as in Example 2 except that a zirconium source, an iron source, a silicon source, a lithium source, and a phosphorus source were dissolved in the solvent in that order as described below in the dissolving step.

<Dissolving Step>

A zirconium source $ZrCl_4$ was weighed and added to ethanol whose molar amount was 30 times the molar amount of Li and stirring was conducted until complete dissolution was achieved. After confirming the complete dissolution, an iron source $Fe(NO_2)_3 \cdot 9H_2O$, a silicon source $Si(OC_2H_5)_4$, and a lithium source $LiCH_2COO$ were weighed and sequentially dissolved in that order to prepare a homogeneous solution. Lastly, a phosphorus source $H_2PO_4$ (85 wt %) was weighed and added and the resulting mixture was stirred until the solution was homogeneous. These source materials were weighed so that Li:Fe:Zr:P:Si=1:0.875:0.125:0.75:0.25 (molar ratio) where the amount of the lithium source $LiCH_3COO$ was 0.9899 g. The obtained homogeneous solution was stirred at room temperature for 1 hour using a stirrer.

(Results)

The powder X-ray diffraction pattern of the resulting composite oxide was obtained as in Example 2. An X-ray diffraction pattern similar to that of Example 2 was obtained and generation of a crystal phase having an olivine structure was confirmed. Absence of peaks attributable to impurities such as $ZrO_2$ was also confirmed. The average particle size of the gel after grinding was 25.6 μm.

Example 4

A lithium-containing composite oxide was made as in Example 2 except that iron+zirconium sources, a lithium source, a phosphorus source, and a silicon source were dissolved in the solvent in that order in the dissolving step as described below.

<Dissolving Step>

An iron source $Fe(NO_3)_3 \cdot 9H_2O$ and a zirconium source $ZrCl_4$ were weighed and added simultaneously to ethanol whose molar amount was 30 times the molar amount of Li, and the resulting mixture was stirred until complete dissolution was achieved. After confirming the complete dissolution, a lithium source $LiCH_3COO$ was weighed and added to the solution. The resulting mixture was stirred to prepare a homogeneous solution. Next, a phosphorus source $H_3PO_4$ (85 wt %) was weighed and added and the resulting mixture was stirred until the solution was homogeneous. Lastly, a silicon source $Si(OC_2H_5)_4$ was weighed and added, and the resulting mixture was stirred to prepare a homogeneous solution. These source materials were weighed so that Li:Fe:Zr:P:Si=1:0.875:0.125:0.75:0.25 (molar ratio) where the amount of the lithium source $LiCH_3COO$ was 0.9899 g. The obtained homogeneous solution was stirred at room temperature for 1 hour using a stirrer.

(Results)

The powder X-ray diffraction pattern of the resulting composite oxide was obtained as in Example 2. An X-ray diffraction pattern similar to that of Example 2 was obtained and generation of a crystal phase having an olivine structure was confirmed. Absence of peaks attributable to impurities such as $ZrO_2$ was also confirmed. The average particle size of the gel after grinding was 25.6 μm.

Example 5

A lithium-containing composite oxide was made as in Example 2 except that an iron source, a zirconium source, a silicon source, a phosphorus source, and a lithium source were dissolved in the solvent in that order and $LiNO_3$ was used as the lithium source in the dissolving step as described below.

An iron source $Fe(NO_3)_3 \cdot 9H_2O$ was weighed and added to ethanol whose molar amount was 30 times the molar amount of Li, and stirring was conducted until complete dissolution was achieved. After confirming the complete dissolution, a zirconium source $ZrCl_4$ and a silicon source $Si(OC_2H_5)_4$ were weighed and sequentially dissolved in that order to prepare a homogeneous solution. Next, a phosphorus source $H_3PO_4$ (85 wt %) was weighed and added, and stirring was continued until the solution was homogeneous. Lastly, a lithium source $LiNO_3$ was weighed and added and stirring was conducted until the solution was homogeneous. These source materials were weighed so that Li:Fe:Zr:P:Si=1:0.875:0.125:0.75:0.25 (molar ratio) where the amount of the lithium source $LiNO_3$ was 1.0342 g. The obtained homogeneous solution was stirred at room temperature for 1 hour using a stirrer.

(Results)

Figure 5:
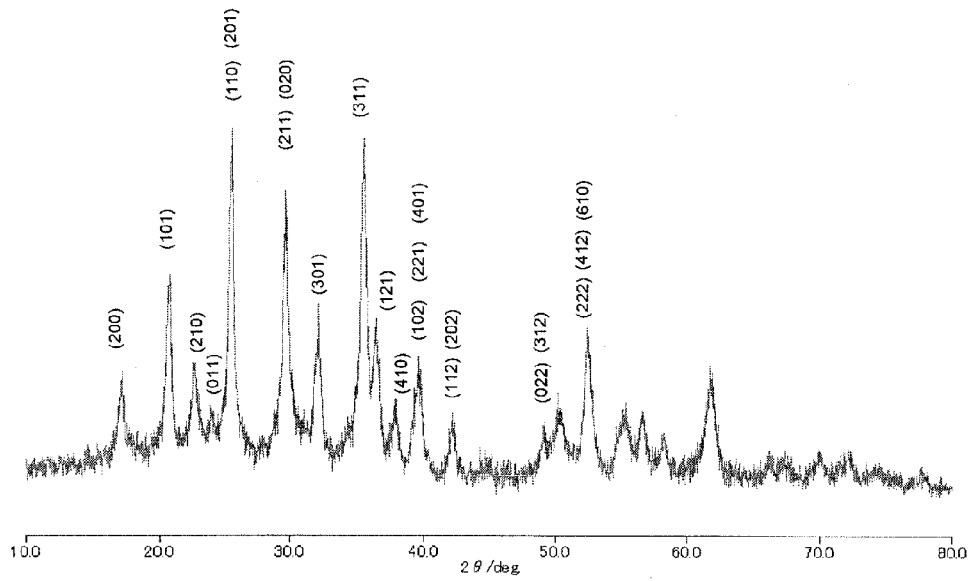
FIG. 5 is a diagram of an X-ray diffraction pattern showing the structure of a lithium-containing composite oxide obtained in Example 5.

The powder X-ray diffraction pattern of the resulting composite oxide was obtained as in Example 2. The results are shown in FIG. 5. Generation of a crystal phase having an olivine structure was confirmed. Absence of the peaks attributable to impurities such as $ZrO_2$ was also confirmed. The average particle size of the gel after grinding was 25.6 μm.

Example 6

A lithium-containing composite oxide was made as in Example 2 except that a silicon source, an iron source, a lithium source, a zirconium source, and a phosphorus source were dissolved in a solvent in that order in the dissolving step as described below.

<Dissolving Step>

A silicon source $Si(OC_2H_5)_4$ and an iron source $Fe(NO_2)_3 \cdot 9H_2O$ were weighed and added in that order to ethanol whose molar amount was 30 times the molar amount of Li. The resulting mixture was stirred until complete dissolution was achieved. After confirming the complete dissolution, a lithium source $LiCH_2COO$ and a zirconium source $ZrCl_4$ were weighed and dissolved in that order to prepare a homogeneous solution. Lastly, a phosphorus source $H_2PO_4$ (85 wt %) was weighed and added, and the resulting mixture was stirred until the solution was homogeneous. These source materials were weighed so that Li:Fe:Zr:P:Si=1:0.875:0.125: 0.75:0.25 (molar ratio) where the amount of the lithium source $LiCH_3COO$ was 0.9899 g. The resulting homogenous solution was stirred at room temperature for 1 hour with a stirrer.

(Results)

The powder X-ray diffraction pattern of the resulting composite oxide was obtained as in Example 2. An X-ray diffraction pattern similar to that of Example 2 was obtained and generation of a crystal phase having an olivine structure was confirmed. Absence of peaks attributable to impurities such as $ZrO_2$ was also confirmed. The average particle size of the gel after grinding was 25.6 μm.

Example 7

A lithium-containing composite oxide was made as in Example 2 except that a lithium source, a silicon source, an iron source, a zirconium source, and a phosphorus source were dissolved in the solvent in that order, $Si(OCH_3)_4$ was used as the silicon source, water was added to dissolve the lithium source, and the lithium source and the silicon source were reacted in a 60° C. atmosphere in the dissolving step as described below.

<Dissolving Step>

LiCH$_3$COO was added to ethanol whose molar amount was 30 times the molar amount of Li and 2.1263 g of water was added thereto to dissolve LiCH$_2$COO. After the solution was thoroughly stirred and the dissolution of LiCH$_2$COO was confirmed, Si(OCH$_2$)$_4$ was added and the resulting mixture was stirred in a 60° C. atmosphere for 1 hour. Next, an iron source Fe(NO$_2$)$_3$.9H$_2$O was weighed and added, and the resulting mixture was stirred until complete dissolution was achieved. After confirming the complete dissolution, a zirconium source ZrCl$_4$ was weighed and dissolved in the solution to prepare a homogenous solution. Next, a phosphorus source H$_2$PO$_4$ (85 wt %) was weighed and added, and the resulting mixture was stirred until the solution was homogenous. The source materials were weighed so that Li:Fe:Zr:P:Si=1: 0.875:0.125:0.75:0.25 (molar ratio) where the amount of the lithium source LiCH$_2$COO was 0.9899 g. The resulting homogeneous solution was stirred at room temperature for 1 hour with a stirrer.

(Results)

Figure 6:
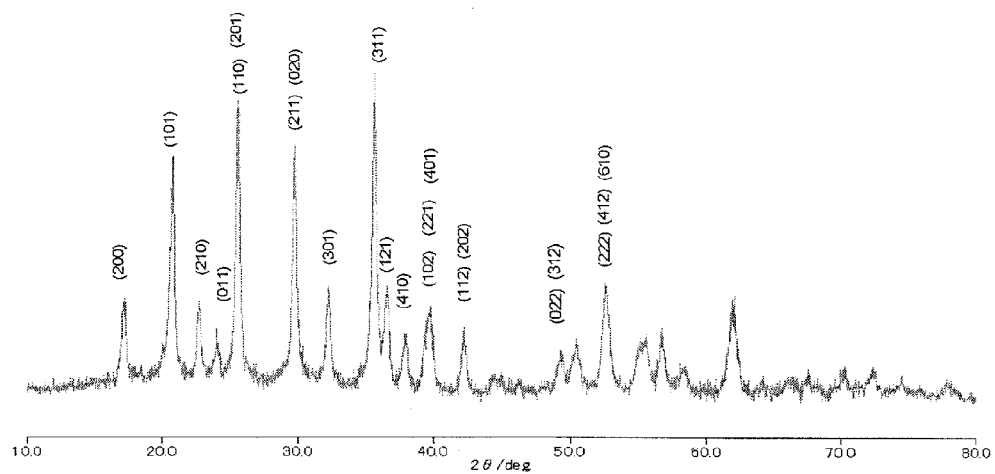
FIG. 6 is a diagram of an X-ray diffraction pattern showing the structure of a lithium-containing composite oxide obtained in Example 7.

The powder X-ray diffraction pattern of the resulting composite oxide was obtained as in Example 2. The results are shown in FIG. 6. Generation of a crystal phase having an olivine structure was confirmed. Absence of peaks attributable to impurities such as ZrO$_2$ was also confirmed. The average particle size of the gel after grinding was 15.6 µm.

Example 8

A lithium-containing composite oxide was made as in Example 2 except that a lithium source, a silicon source, a zirconium source, an iron source, and a phosphorus source were dissolved in the solvent in that order, Si(OCH$_3$)$_4$ was used as the silicon source, water was added to dissolve the lithium source, and the lithium source and the silicon source were reacted in a 60° C. atmosphere in the dissolving step as described below.

<Dissolving Step>

LiCH$_3$COO was added to ethanol whose molar amount was 30 times the molar amount of Li and 2.1263 g of water was added to dissolve LiCH$_3$COO. After the solution was thoroughly stirred and dissolution of LiCH$_3$COO was confirmed, Si(OCH$_3$)$_4$ was added and the resulting mixture was stirred in a 60° C. atmosphere for 1 hour. Next, a zirconium source ZrCl$_4$ was weighed and added, and the resulting mixture was stirred until complete dissolution was achieved. After confirming the complete dissolution, an iron source Fe(NO$_3$)$_3$.9H$_2$O was weighed and dissolved to prepare a homogeneous solution. Lastly, a phosphorus source H$_3$PO$_4$ (85 wt %) was weighed and added, and the resulting mixture was stirred until the solution was homogeneous. The source materials were weighed so that Li:Fe:Zr:P:Si=1:0.875:0.125: 0.75:0.25 (molar ratio) where the amount of LiCH$_3$COO was 0.9899 g. The resulting homogeneous solution was stirred at room temperature for 1 hour with a stirrer.

(Results)

The powder X-ray diffraction pattern of the resulting composite oxide was obtained as in Example 2. An X-ray diffraction pattern similar to that of Example 2 was obtained and generation of a crystal phase having an olivine structure was confirmed. Absence of peaks attributable to impurities such as ZrO$_2$ was also confirmed. The average particle size of the gel after grinding was 0.2 µm.

Example 9

A lithium-containing composite oxide was made as in Example 2 except that a lithium source, a silicon source, zirconium+iron sources, and a phosphorus source were dissolved in the solvent in that order, Si(OCH$_3$)$_4$ was used as the silicon source, water was added to dissolve the lithium source, and the lithium source and silicon source were reacted in a 60° C. atmosphere in the dissolving step as described below.

<Dissolving Step>

LiCH$_3$COO was added to ethanol whose molar amount was 15 times the molar amount of Li and 2.1263 g of water was added thereto to dissolve LiCH$_3$COO. After the solution was thoroughly stirred and the dissolution of LiCH$_3$COO was confirmed, Si(OCH$_3$)$_4$ was added and the resulting mixture was stirred in a 60° C. atmosphere for 1 hour. Into a separate container containing the same amount of ethanol, a zirconium source ZrCl$_4$ and an iron source Fe(NO$_3$)$_3$.9H$_2$O were weighed and added. Stirring was conducted until complete dissolution was achieved. These two solutions were mixed with each other to prepare a homogeneous solution and then lastly a phosphorus source H$_3$PO$_4$ (85 wt %) was weighed and added, and the resulting mixture was stirred until homogeneous to prepare a solution. These source materials were weighed so that Li:Fe:Zr:P:Si=1:0.875:0.125:0.75:0.25 (molar ratio) where the amount of the lithium source LiCH$_3$COO was 0.9899 g. The resulting homogenous solution was stirred at room temperature for 1 hour with a stirrer.

(Results)

The powder X-ray diffraction pattern of the resulting composite oxide was obtained as in Example 2. An X-ray diffraction pattern similar to that in Example 2 was obtained and generation of a crystal phase having an olivine structure was confirmed. Absence of peaks attributable to impurities such as ZrO$_2$ was also confirmed. The average particle size of the gel after grinding was 0.2

Example 10

A lithium-containing composite oxide was made as in Example 2 except that an iron source, a silicon source, a lithium source, a zirconium source, and a phosphorus source were dissolved in the solvent in that order and the amount of the phosphorus source was increased by 5% in terms of molar ratio in the dissolving step as described below.

<Dissolving Step>

An iron source Fe(NO$_3$)$_3$.9H$_2$O was weighed and added to ethanol whose molar amount was 30 times the molar amount of Li and stirring was conducted until complete dissolution was achieved. After confirming the complete dissolution, a silicon source Si(OC$_2$H$_5$)$_4$, a lithium source LiCH$_3$COO, and a zirconium source ZrCl$_4$ were weighed and sequentially dissolved in that order to prepare a homogeneous solution. Lastly, a phosphorus source H$_3$PO$_4$ (85 wt %) was weighed and added, and the resulting mixture was stirred until homogenous. These source materials were weighed so that Li:Fe: Zr:P:Si=1:0.875:0.125:0.7875:0.25 (molar ratio) where the amount of lithium source LiCH$_3$COO was 0.9899 g. The resulting homogeneous solution was stirred at room temperature for 1 hour with a stirrer.

(Results)

Figure 7:
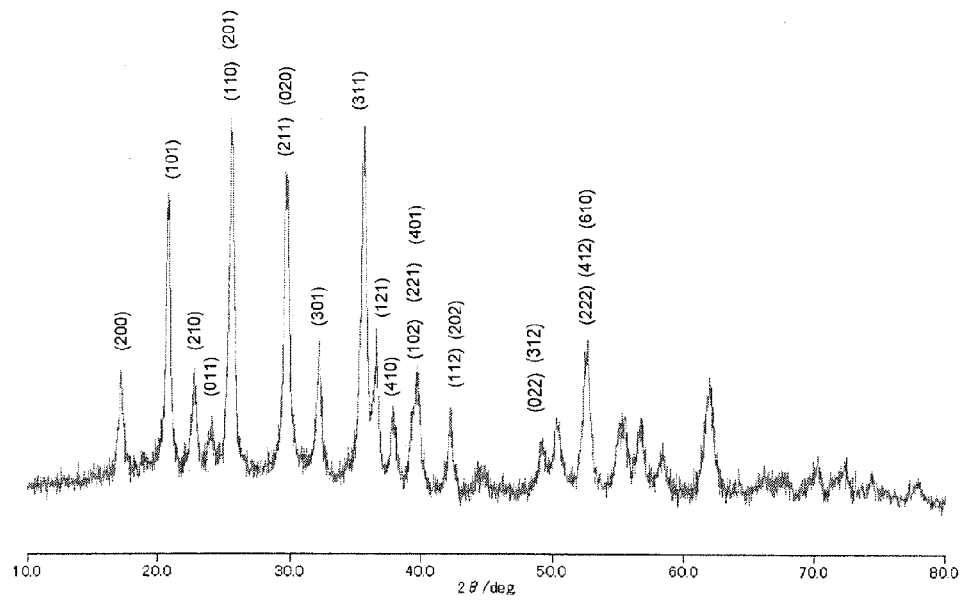
FIG. 7 is a diagram of an X-ray diffraction pattern showing the structure of a lithium-containing composite oxide obtained in Example 10.

The powder X-ray diffraction pattern of the resulting composite oxide was obtained as in Example 2. The results are shown in FIG. 7. Generation of a crystal phase having an olivine structure was confirmed. Absence of peaks attributable to impurities such as $ZrO_2$ was also confirmed. The average particle size of the gel after grinding was 0.1 µm.

Example 11

Figure 8:
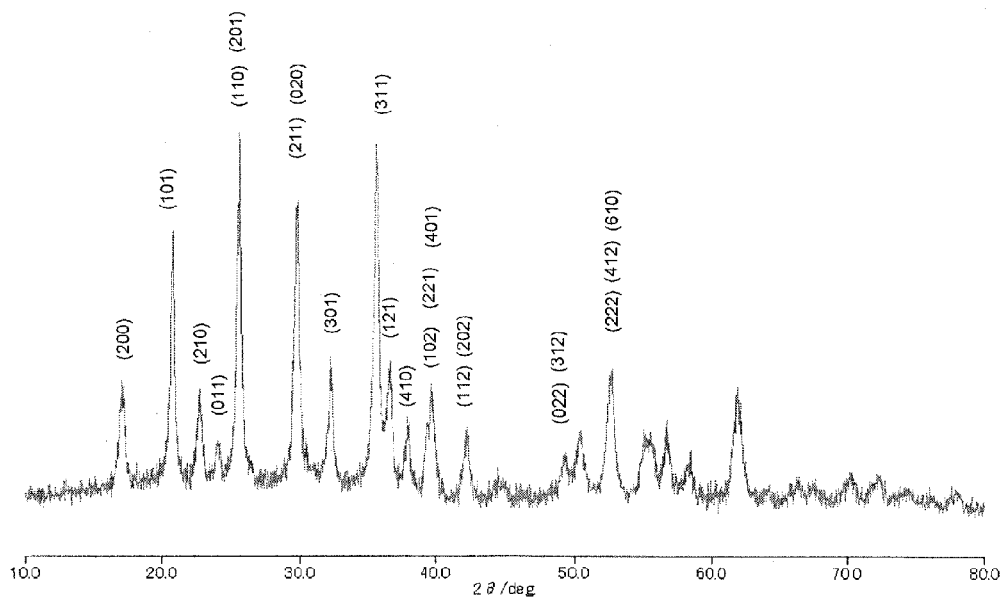
FIG. 8 is a diagram of an X-ray diffraction pattern showing the structure of a lithium-containing composite oxide obtained in Example 11.

A lithium-containing composite oxide was made as in Example 2 except that an iron source, a zirconium source, a lithium source, a silicon source, and a phosphorus source were dissolved in the solvent in that order and the amount of the phosphorus source was increased by 10% in terms of molar ratio in the dissolving step as described below.
<Dissolving Step>
An iron source $Fe(NO_2)_3 \cdot 9H_2O$ was weighed and added to ethanol whose molar amount was 30 times the molar amount of Li and the resulting mixture was stirred until complete dissolution was achieved. After confirming the complete dissolution, a zirconium source $ZrCl_4$, a lithium source $LiCH_2COO$, and a silicon source $Si(OC_2H_5)_4$ were weighed and sequentially dissolved in that order to prepare a homogeneous solution. Lastly, a phosphorus source $H_2PO_4$ (85 wt %) was weighed and added, and the resulting mixture was stirred to prepare a homogeneous solution. The source materials were weighed so that Li:Fe:Zr:P:Si=1:0.875:0.125:0.825:0.25 (molar ratio) where the amount of $LiCH_2COO$ was 0.9899 g. The resulting homogenous solution was stirred at room temperature for 1 hour with a stirrer.
(Results)
The powder X-ray diffraction pattern of the resulting composite oxide was obtained as in Example 2. The results are shown in FIG. 8. Generation of a crystal phase having an olivine structure was confirmed. Absence of peaks attributable to impurities such as $ZrO_2$ was also confirmed. The average particle size of the gel after grinding was 0.1 µm.

Example 12

Figure 9:
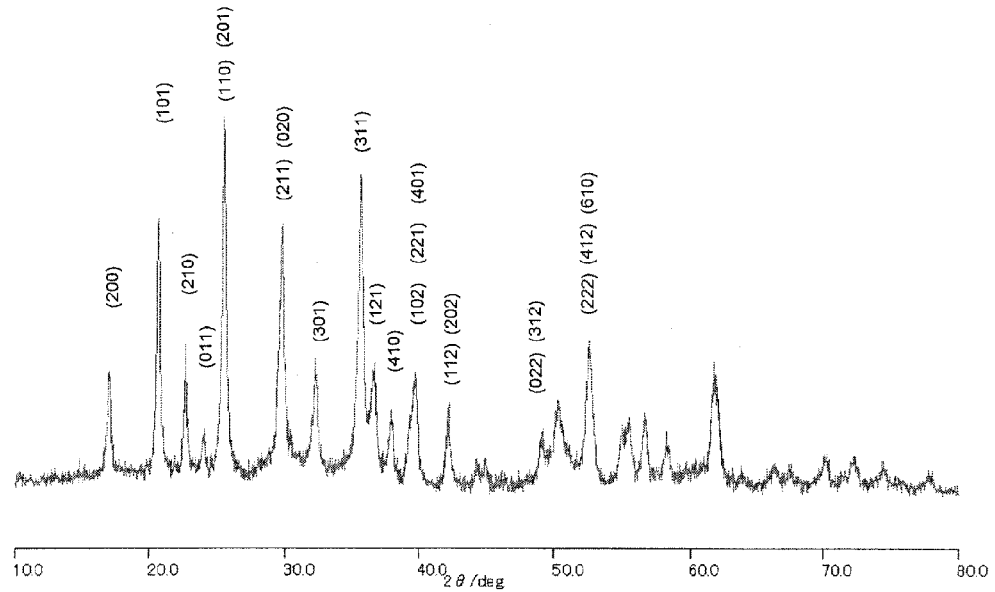
FIG. 9 is a diagram of an X-ray diffraction pattern showing the structure of a lithium-containing composite oxide obtained in Example 12.

A lithium-containing composite oxide was made as in Example 2 except that the heating temperature was changed to 40° C. in the gelating step.
(Results)
The powder X-ray diffraction pattern of the resulting composite oxide was obtained as in Example 2. The results are shown in FIG. 9. Generation of a crystal phase having an olivine structure was confirmed. Absence of peaks attributable to impurities such as $ZrO_2$ was also confirmed. The average particle size of the gel after grinding was 25.6 µm.

Example 13

Figure 10:
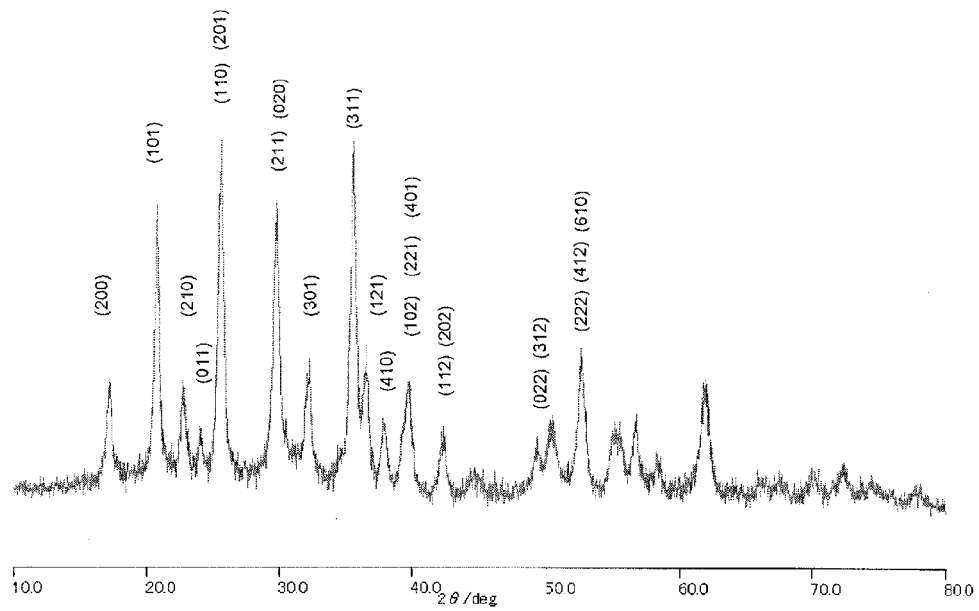
FIG. 10 is a diagram of an X-ray diffraction pattern showing the structure of a lithium-containing composite oxide obtained in Example 13.

A lithium-containing composite oxide was made as in Example 2 except that the heating temperature was changed to 30° C. in the gelating step.
(Results)
The powder X-ray diffraction pattern of the resulting composite oxide was obtained as in Example 2. The results are shown in FIG. 10. Generation of a crystal phase having an olivine structure was confirmed. Absence of peaks attributable to impurities such as $ZrO_2$ was also confirmed. The average particle size of the gel after grinding was 25.6 µm.

Comparative Example 3

A lithium-containing composite oxide was made as in Example 2 except that the following method was employed in the dissolving step.

Figure 11:
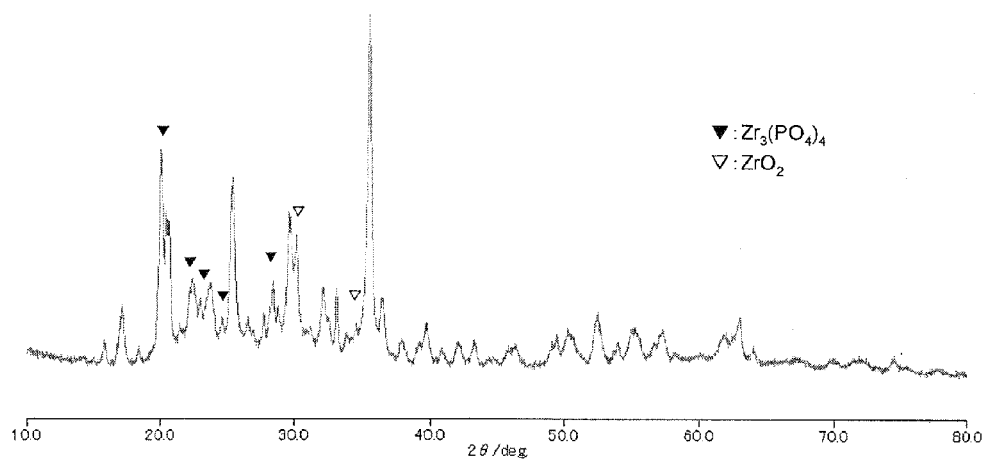
FIG. 11 is a diagram of an X-ray diffraction pattern showing the structure of a lithium-containing composite oxide obtained in Comparative Example 3.

<Dissolving Step>
A zirconium source $ZrCl_4$ was weighed and added to ethanol whose molar amount was 15 times the molar amount of Li and stirring was conducted until complete dissolution was achieved. After confirming the complete dissolution, a phosphorus source $H_3PO_4$ (85 wt %) was weighed and mixed thereto. White precipitates were generated on stirring. Into a separate container containing ethanol whose molar amount was 15 times the molar amount of Li, a silicon source $Si(OC_2H_5)_4$, an iron source $Fe(NO_3)_3 \cdot 9H_2O$, and a lithium source $LiCH_3COO$ were weighed and sequentially dissolved in that order to prepare a homogeneous solution. The resulting homogenous solution was mixed with the solution in which the white precipitates were generated and the resulting mixture was stirred to obtain an opaque solution. The source materials were weighed so that Li:Fe:Zr:P:Si=1:0.875:0.125:0.75:0.25 (molar ratio) where the amount of the lithium source $LiCH_3COO$ was 0.9899 g. The resulting solution was stirred at room temperature for 1 hour with a stirrer.
(Results)
The powder X-ray diffraction pattern of the resulting composite oxide was obtained as in Example 2. The results are shown in FIG. 11. The X-ray diffraction pattern obtained had peaks attributable $ZrO_2$ and $Zr_3(PO_4)_4$. The average particle size of the gel after grinding was 25.6 µm.

Example 14

Production of Battery

About 1 g of the lithium-containing composite oxide produced in each of Examples and Comparative Examples was weighed, ground in a agate mortar, and mixed with about 10 wt % of acetylene black as an electronic conductor and about 10 wt % of Teflon (registered trade mark) resin powder as a binder. The resulting mixture was dispersed in N-methyl-2-pyrrolidone to prepare a slurry and the slurry was applied to both sides of an aluminum foil having a thickness of 20 µm by a doctor blade method. The amount of the slurry applied was about 5 mg/cm². After this electrode was dried, the electrode was pressed to prepare a positive electrode.

Natural graphite powder was used as the negative electrode active material. To the natural graphite powder, about 10 wt % of Teflon (registered trade mark) resin powder as a binder was mixed. The resulting mixture was dispersed in N-methyl-2-pyrrolidone to prepare a slurry and the slurry was applied to both sides of a copper foil having a thickness of 20 µm and dried. The electrode was pressed to prepare a negative electrode.

The positive electrode and the negative electrode prepared as such were each cut into a 30 mm×30 mm piece. An aluminum tab having a width of 3 mm and a length of 50 mm and a copper tab having a width of 3 mm and a length of 50 mm that serve as current introduction terminals for the battery were welded to the positive electrode and the negative electrode, respectively. A separator composed of porous polyethylene was placed between the positive electrode and the negative electrode. The resulting stack was placed between laminate films, which were two metal foils laminated with a thermoplastic resin and serve as a battery outer casing, and then the peripheral portion was thermally bonded to provide hermetic seal. The resulting laminate had an open portion through which the electrolyte was poured. An electrolyte containing 50 vol % of ethylene carbonate and 50 vol % of diethyl carbonate in which 1 mol/l of $LiPF_6$ had been dissolved was fed through the open portion. After the electrolyte was poured into the interior of the battery, the open portion of the battery casing was sealed to end production of a secondary battery.

(Evaluation of Battery Characteristics)

Each of the batteries produced as such were charged for the first time in a 25° C. atmosphere. The charging current was 0.1 mA and the charging was terminated when the potential of the battery reached 4 V. After completion of the charging, discharge was conducted at 0.1 mA and terminated when the potential of the battery reached 2.0 V.

(Results)

The evaluation results of the battery characteristics of the batteries that contain lithium-containing composite oxides produced in Examples and Comparative Examples are shown in Table 2. It was confirmed that the lithium-containing composite oxides produced by the production method of the present invention had higher discharge capacities than Comparative Examples.

|  | Lithium-containing composite oxide used | Capacity (mAh/g) |
| --- | --- | --- |
| Battery 1 | Example 2 | 100.7 |
| Battery 2 | Example 3 | 95.6 |
| Battery 3 | Example 4 | 98.1 |
| Battery 4 | Example 5 | 91.4 |
| Battery 5 | Example 6 | 97.9 |
| Battery 6 | Example 7 | 101.4 |
| Battery 7 | Example 8 | 102.8 |
| Battery 8 | Example 9 | 102.6 |
| Battery 9 | Example 10 | 103.2 |
| Battery 10 | Example 11 | 105.7 |
| Battery 11 | Example 12 | 98.8 |
| Battery 12 | Example 13 | 94.2 |
| Battery 13 | Comparative Example 1 | 56.7 |
| Battery 14 | Comparative Example 3 | 63.7 |

The invention claimed is:

1. A method for producing a lithium-containing composite oxide represented by general formula (1) below, the method comprising: a step of preparing a solution by dissolving a lithium source, an element M source, a phosphorus source, and an element X source that serve as source materials in a solvent, the phosphorus source being added after at least the element M source is dissolved, the step comprising a step of reacting an anhydride of a weak acid lithium salt as the lithium source with the element X source, and a step of reacting a halide of the element M as the element M source with the element X source;

a step of gelating the resulting solution; and a step of calcining the resulting gel:

$$Li_xM_yP_{1-z}X_zO_4 \quad (1)$$

(wherein M represents Fe and Zr; X represents Si; and $0<x\leq2$, $0.8\leq y\leq1.2$, $0<z\leq0.5$).

2. The method according to claim 1, further comprising a step of grinding the gel to adjust the average particle size to 0.1 to 50 µm prior to the step of calcining the gel.

3. The method according to claim 1, wherein, in the step of gelating, the solution prepared is heated at a temperature in a range of room temperature to a boiling point of the solvent.

4. The method according to claim 1, wherein the zirconium source is a zirconium halide and the iron source is a hydrate of a strong acid salt.

5. The method according to claim 4, wherein the silicon source is a silicon alkoxide and the silicon alkoxide is added before or after addition of the phosphorus source.

* * * * *